United States Patent [19]
Daniels et al.

[11] Patent Number: 5,234,322
[45] Date of Patent: Aug. 10, 1993

[54] PROPORTIONING PUMP IMPROVEMENTS

[75] Inventors: Raymond R. Daniels, Belleair; Norman W. Scheid, Tarpon Springs; Donald C. Bryant, Palm Harbor, all of Fla.

[73] Assignee: Chemilizer Products, Inc., Clearwater, Fla.

[21] Appl. No.: 996,564

[22] Filed: Dec. 24, 1992

[51] Int. Cl.⁵ .................................... F04B 17/00
[52] U.S. Cl. ........................... 417/403; 417/404
[58] Field of Search ............ 417/375, 403, 404, 534, 417/535, 418, 486, 547, 528, 417, 395; 91/224, 229, 346, 437

[56] References Cited

U.S. PATENT DOCUMENTS

| | | | |
|---|---|---|---|
| Re. 29,428 | 4/1889 | Bagley | 417/528 |
| 1,065,225 | 6/1913 | Cunningham | 417/528 |
| 1,097,955 | 5/1914 | Wallinder | 417/528 |
| 2,408,075 | 9/1946 | Kowalsky | 91/224 |
| 2,446,748 | 8/1948 | Etter | 417/547 |
| 2,539,292 | 1/1951 | Anderson | 91/229 |
| 2,916,998 | 12/1959 | Miller | 137/99 |
| 3,114,379 | 12/1963 | Cordis | 137/99 |
| 3,175,512 | 3/1965 | Sutliff | 417/547 |
| 3,213,873 | 10/1965 | Condis | 137/512.3 |
| 3,361,036 | 1/1968 | Harvey | 91/229 |
| 3,374,746 | 3/1968 | Chewault | 417/528 |
| 3,380,467 | 4/1968 | Diehl, Jr. | 417/404 |
| 3,699,846 | 10/1972 | Stomper | 91/346 |
| 3,700,359 | 10/1972 | Vanderjagt | 417/404 |
| 3,865,126 | 2/1975 | Baggaley | 137/99 |
| 3,921,501 | 11/1975 | Rosback | 91/437 |
| 3,945,772 | 3/1976 | Van-de-Modretele | 417/489 |
| 3,960,058 | 6/1976 | Berkelius | 91/229 |
| 3,963,038 | 6/1976 | Jensen | 137/99 |
| 3,999,896 | 12/1976 | Sebastiani | 417/404 |
| 4,004,602 | 1/1977 | Cordis et al. | 137/99 |
| 4,028,014 | 6/1977 | Cocks | 417/403 |
| 4,060,351 | 11/1977 | Cloup | 417/520 |
| 4,610,192 | 9/1986 | Hartley et al. | 91/346 |
| 4,750,871 | 6/1988 | Curwen | 417/418 |
| 4,756,329 | 7/1988 | Cloup | 91/229 |
| 4,781,546 | 11/1988 | Curwen | 417/417 |
| 5,055,008 | 10/1991 | Daniels et al. | 417/403 |

Primary Examiner—Richard A. Bertsch
Assistant Examiner—Peter Korytnyk
Attorney, Agent, or Firm—Harold D. Shall

[57] ABSTRACT

A proportioning pump for liquid additive metering having a housing with a diaphragm piston therein and inlet and outlet primary fluid lines to the housing and inlet and outlet valves in the housing for moving the piston up and down. A pair of additive pistons for pumping an additive liquid into the primary fluid with the additive pistons being moved by the diaphragm piston. An overcenter spring loaded connection connects the diaphragm piston to the inlet and outlet valves and a fail safe mechanism opens both the inlet and outlet valves in the event the spring in the overcenter connection fails. One of the additive pistons has an O-ring therein which acts as a seal and a check valve.

7 Claims, 4 Drawing Sheets

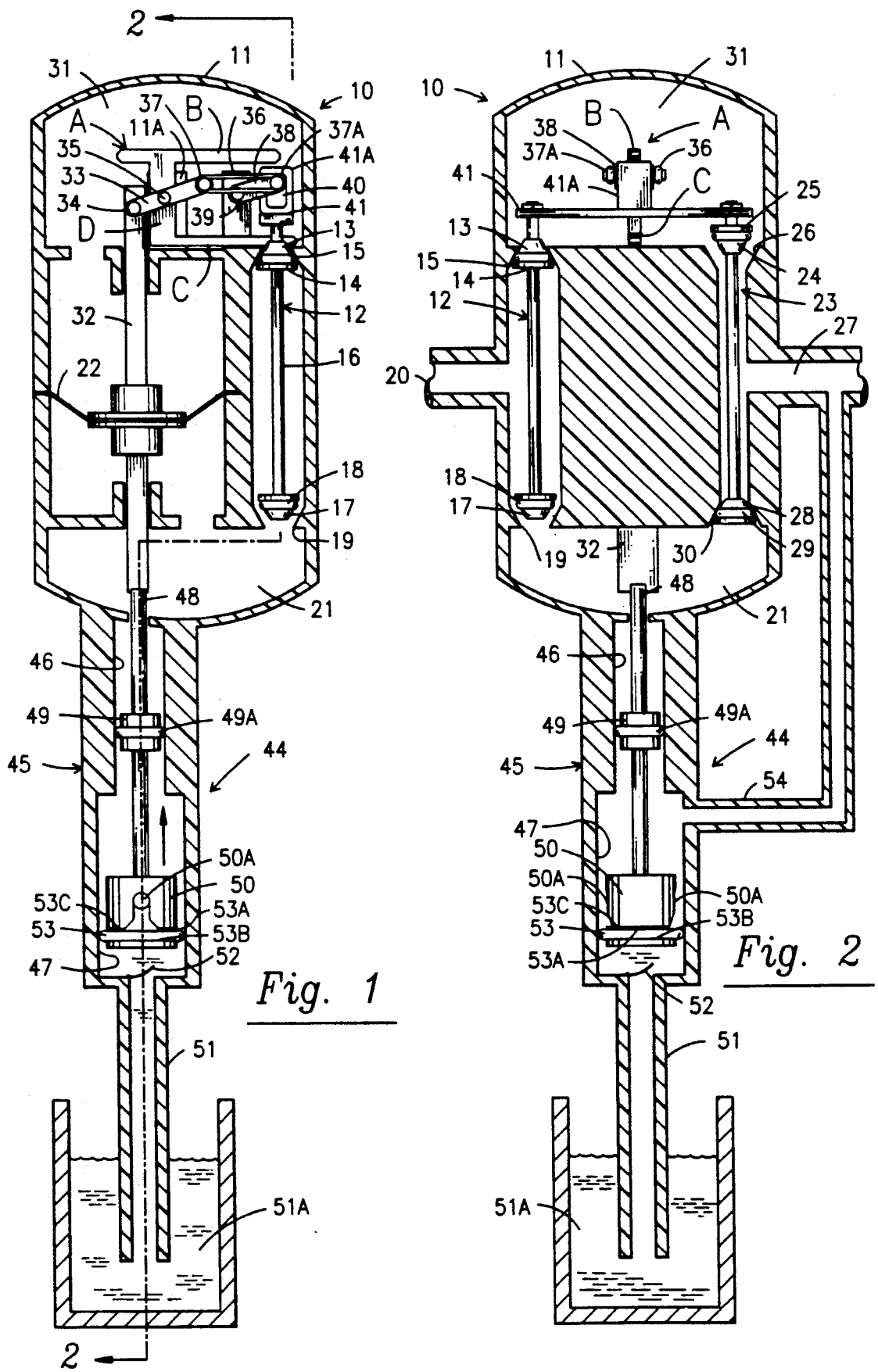

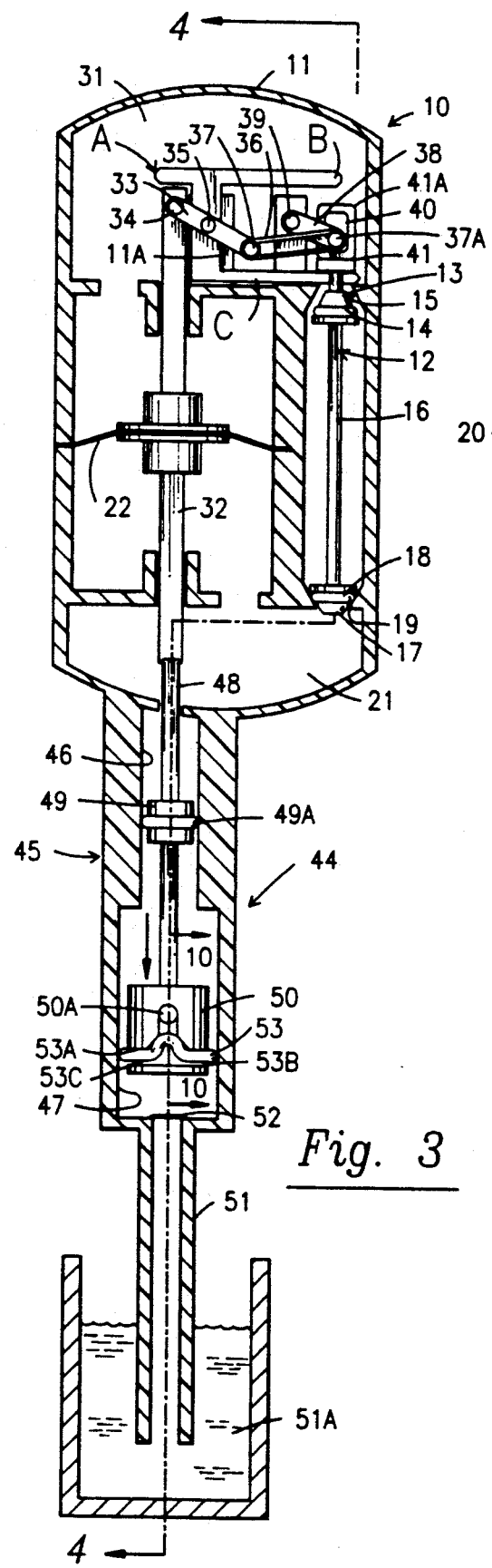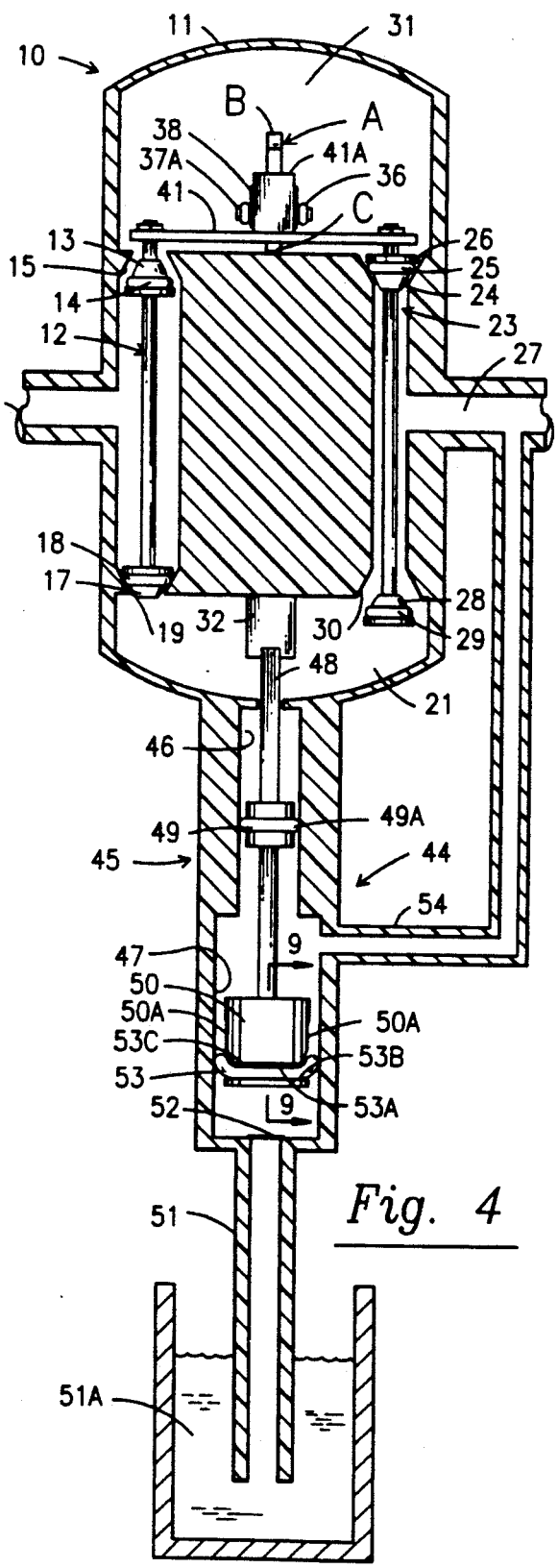
Fig. 3
Fig. 4

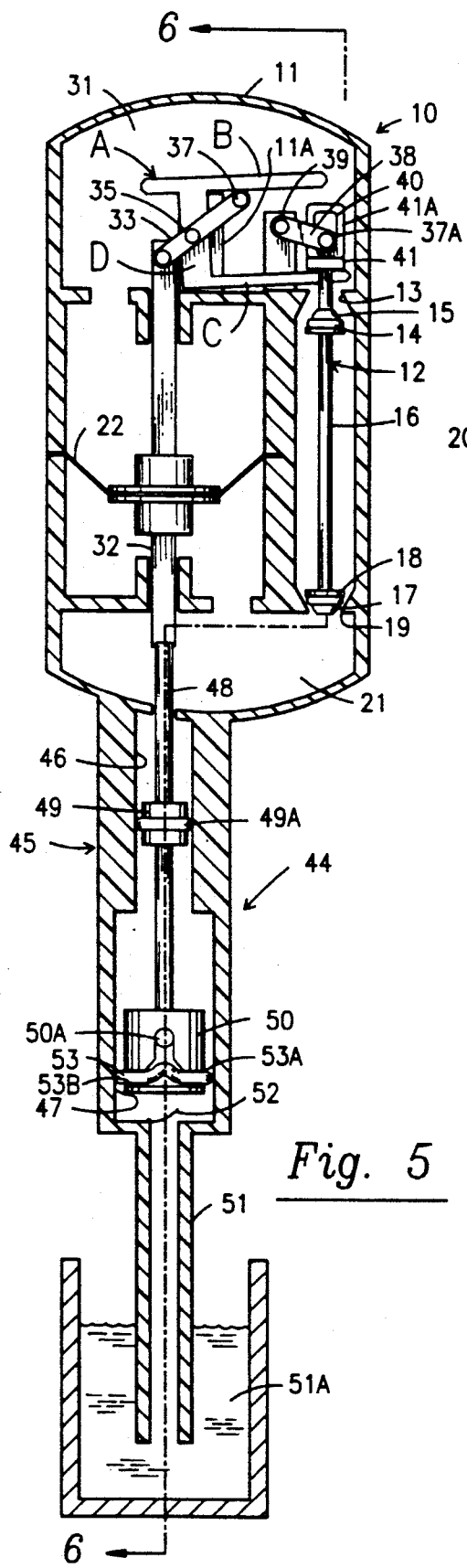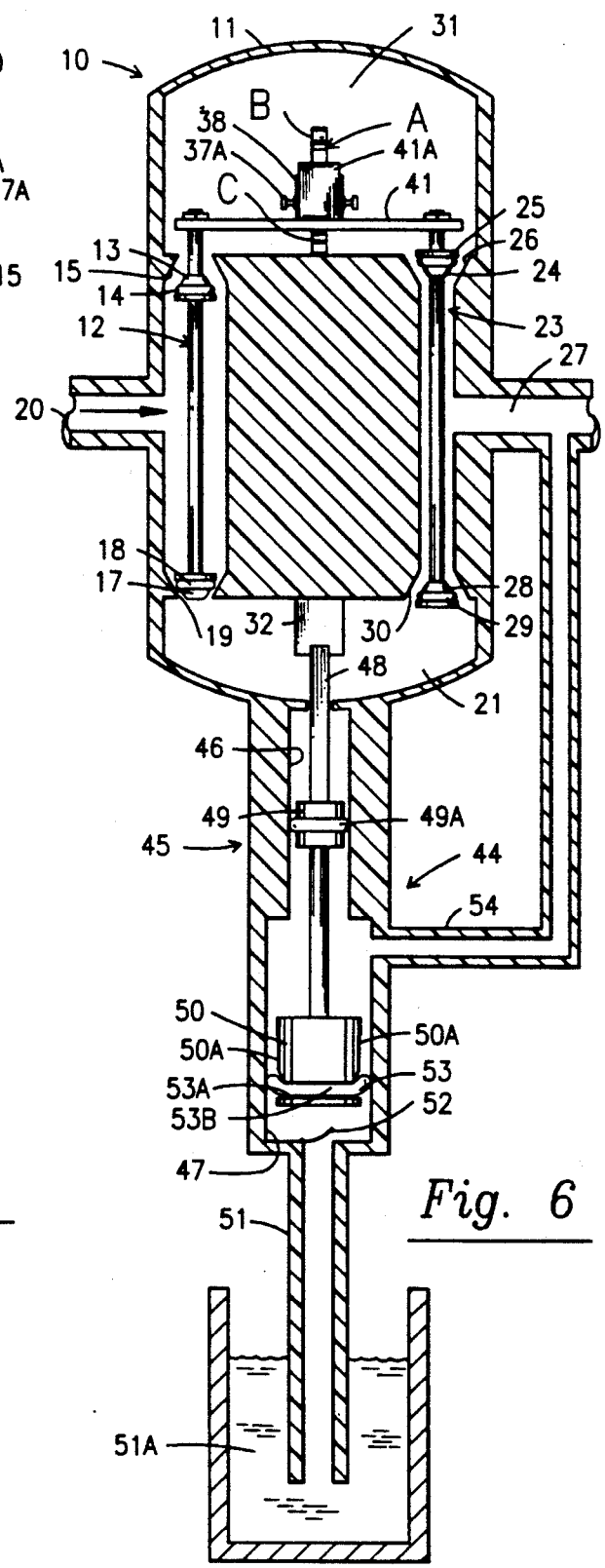
Fig. 5
Fig. 6

PROPORTIONING PUMP IMPROVEMENTS

BACKGROUND OF THE INVENTION

This invention relates to a proportioning pump in the form of a liquid metering apparatus generally and more particularly to an apparatus for supplying a liquid additive to a flow of liquid. A device according to this invention uses the flow of a liquid to operate a pump to enable a specific quantity of additive to be injected into said liquid.

DESCRIPTION OF PRIOR ART

The prior art utilizes a reciprocating pump to inject an additive fluid into the main fluid that drives the reciprocating pump. The devices, prior to the device of our U.S. Pat. No. 5,055,008, of the reciprocating pump type which are powered by a first fluid to power the additive fluid are so structured that upon failure of a part and loss of reciprocating movement the flow of the first fluid is blocked so that if, for example, the device was being used in a poultry watering system, the loss of reciprocating movement would deprive the poultry of all water supply. In our U.S. Pat. No. 5,055,008, bypass valves become activated upon the part failure which allows for the continued flow of the primary fluid. In the device of the instant invention, a mechanism is provided which, upon part failure, places the on-off valves within the device, which control the flow of primary fluid, into a neutral position which allows for continued flow of the primary fluid. The device of this invention is also an improvement over the prior art by providing a novel piston and "O-ring" arrangement that acts as a seal for the additive pump in one direction of operation while also acting as a check valve and opening to flow in the opposite direction of operation.

SUMMARY OF THE INVENTION

Flowing primary driving liquid such as water enters the main pump and drives a water motor which in turn operates an additive pump which draws an additive fluid from a supply container and injects it into the flowing driving water as the latter exits the pump. The additive pump is sized so as to give a certain ratio of additive liquid to the driving water.

The water motor comprises a housing having a diaphragm piston therein which is driven back and forth by diverting the flowing incoming driving water alternately from one side of the diaphragm to the other side by a system of inlet and outlet valves which are activated instantaneously at the extremes of the diaphragm piston stroke by an over-center mechanism.

When the incoming water drives the piston down, it forces water below the piston out of the pump through the outlet valve. When the piston reaches the bottom of its stroke, the over-center spring reacts and pulls the inlet and outlet up thus allowing incoming water to the bottom side of the piston. The piston is pushed up and water above the piston is pushed out of the outlet valve. When the piston reaches the top of its stroke, the over-center spring snaps in the opposite direction and pushes the inlet and outlet valves down again thus starting the cycle over again.

In the event the over-center spring should break and absent any provision, the diaphragm piston will not reciprocate and the flow of driving water through the water motor would be blocked. Our U.S. Pat. No. 5,055,008 provided by-pass valves through the diaphragm piston to allow the continued flow of driving water. In the instant invention a pair of actuating arms are provided, which arms are activated in the event the over-center mechanism breaks, to actuate the inlet and outlet valves and place these valves in a neutral position to thereby allow driving water to go past both the valves and thereby allow for a continuous supply of driving or primary water through the water motor to insure that, for example, the poultry being supplied thereby are not deprived of drinking water.

The additive pump consists of a double piston sized so as to inject an equal amount of additive fluid on the up and down stroke of the pump. The additive pump is reciprocated by the up and down motion of the diaphragm piston and pumps one-half of the desired additive on the up stroke and one-half on the down stroke of the additive pump so that a continuous flow of additive fluid is pumped into the primary or driving water at a location where it exits from the pump, so that the water within the driving pump is not contaminated.

The bottom piston of the additive pump is provided with an "O-ring" which is received in a groove in the bottom piston and the periphery of the O-ring engages the wall of the bore receiving the same thus acting as a seal to the wall.

The inner diameter of the O-ring groove is tapered and on the up stroke of the piston, the O-ring seats against the bottom of the groove to act as a seal between the bore and the piston to allow the piston to draw a vacuum beneath the piston and draw up additive fluid from the supply.

A pair of slots are formed in the piston which start near the bottom of the inner wall of the groove, are deeper than the groove, and extend upwardly therefrom. On the downstroke of the piston the O-ring is deflected into the slots which allows additive fluid to pass under the O-ring and through the slots into the chamber above the piston so that the O-ring acts as an open valve at this time.

BRIEF DESCRIPTION OF THE DRAWINGS

FIG. 1 is a view in longitudinal section of a device according to this invention;

FIG. 2 is a cross sectional view taken along the lines 2—2 in FIG. 1;

FIG. 3 is a view in longitudinal section of the device of FIG. 1 in another operative position;

FIG. 4 is a cross sectional view taken along the lines 4—4 in FIG. 3;

FIG. 5 is a view in longitudinal section of the device of FIG. 1 in its down stroke position showing a broken over-center spring;

FIG. 6 is a cross sectional view taken along the lines 6—6 in FIG. 5;

DETAILED DESCRIPTION OF THE PREFERRED EMBODIMENT

Figures 7, 8, 9, 10:
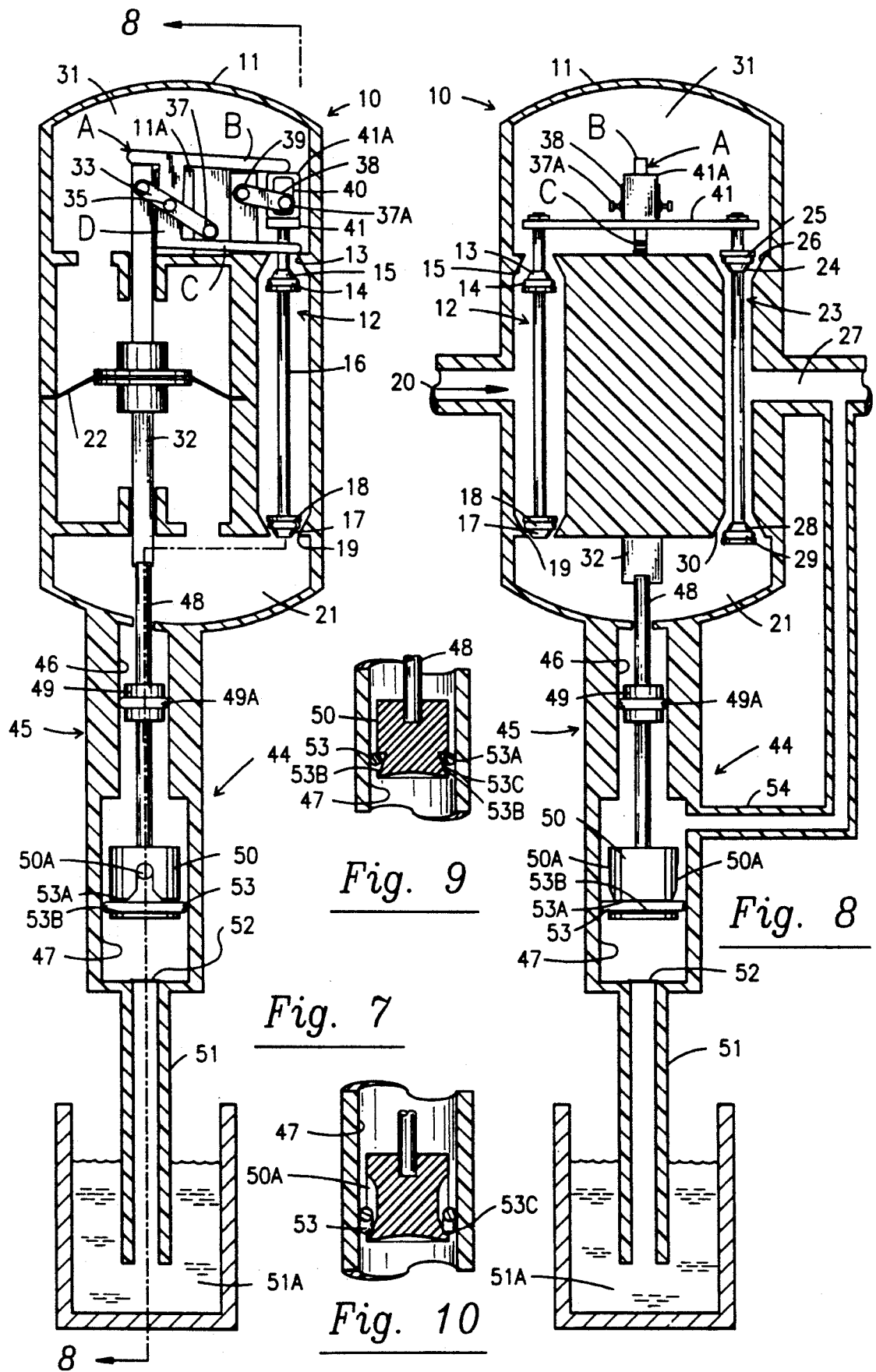
FIG. 7 is a view in longitudinal section of the device of FIG. 1 in its upstroke position showing a broken over-center spring.
FIG. 8 is a cross sectional view taken along the lines 8—8 in FIG. 7.
FIG. 9 is a cross sectional view taken along the lines 9—9 in FIG. 4.
FIG. 10 is a cross sectional view taken along the lines 10—10 in FIG. 3.

Referring now to the drawings and more particularly FIGS. 1 and 2, the up stroke position of a proportioning pump 10 is shown. An inlet valve 12 is in its upper position in a water motor body portion 11 of the pump, in which position, a tapered valve seat 13, on the upper end of the valve 12, carrying an "O-ring" 14 is seated against a tapered shoulder 15 found in the motor body 11. A valve stem 16 connects the upper tapered valve seat 13 to a lower tapered valve seat 17, carrying an "O-ring" 18, which at this time is spaced from a tapered shoulder 19 formed in the body 11. Flowing primary or driving water enters the motor body 11 through an inlet line 20 and flows downwardly past the lower valve seat 17 and tapered shoulder 19 to fill a lower cavity 21 formed below a diaphragm piston 22, the periphery of which piston being secured in and sealed in the surrounding body portion 11.

The water in cavity 21 forces the diaphragm piston 22 upwardly thereby forcing against any water above the piston from the previous downward stroke thereof, which will be hereinafter explained. The water above the piston 22 exits the body 11 through the upper end of an outlet valve 23. The upper end of the outlet valve 23 has a tapered shoulder 24 thereon carrying an "O-ring" 25, which at this time is spaced from a tapered valve seat 26, thereby allowing water to flow there past and out through an outlet line 27. The lower end of the outlet valve 23 has a tapered shoulder 28 therein carrying an "O-ring" 29, which during the upstroke, is seated against a tapered shoulder 30, formed in the body 11, thereby blocking the outlet line 27 from any water entering the pump 10 through the inlet line 20, and present in the cavity 21. The outlet line 27 thereby drains the cavity 31 above the piston 22 during the up stroke of piston 22.

The diaphragm piston 22 has rigidly secured in the center thereof a vertically extending piston rod 32, which is mounted for vertical reciprocal movement in the body 11. As seen in FIG. 1, at the upper end of the piston rod 32 is pivotally secured the left end of a first pair of parallel linkage rods, one of which is shown at 33, by a pivot pin 34. Intermediate the ends of the linkage rod 33, the latter is pivotally mounted to the body 11 by a pivot pin 35. The right ends of the linkage rods 33 are secured to the left ends of a pair of spring bands in the form of "O-rings" 36, the ends of both O-rings 36 being seen in FIG. 2, by a pivot pin 37. The right ends of O-rings 36 are secured to the upper or right end of a pair of linkage rods 38, (only one linkage rod 38 seen in FIG. 1 while the ends of both linkage rods 38 are seen in FIG. 2) by a pivot pin 37A, while the left ends of linkage rods 38 are pivotally mounted to the body 11 by a pivot pin 39.

The pivot pin 37A is mounted in a slot 40 formed in a valve boss 41A on the top of valve bridge 41 which is secured to and joins the upper ends of valves 12 and 23. When the diaphragm piston 22 moves toward its upper position, from its position shown in FIG. 1, no immediate movement of valve bridge 41 takes place, but when the piston 22 moves to its upper position shown in FIG. 3, the linkage rods 33 and 38 joined by the spring O-rings 36 goes over-center and with a snap action takes the position shown in FIG. 3, thereby rapidly reversing the positions of valves 12 and 23. Prior to going over-center, the linkage 33 and 38 do not cause movement of the valves 12 and 23. Similarly, as seen in FIGS. 3 and 4, the over-center linkages 33 and 38 do not cause movement of the valves 12 and 23 on the down stroke until the piston 22 reaches its downward position.

Referring now to FIGS. 3 and 4, the downstroke position of the diaphragm piston 22 is shown. The inlet valve 12 is in its lower position and its valve seat 13 and O-ring 14 are spaced from the shoulder 15. The lower valve seat 17 and its O-ring 18 are seated against the tapered shoulder 19. Flowing water enters the body 11 through the inlet line 20 and flows upwardly past the valve seat 13, and tapered shoulder 15 to fill the upper cavity 31 formed above the piston 22 thereby forcing the piston downwardly and forcing any water in cavity 21 out past the lower open end of valve 23 and out of the body 11 through line 27.

In normal operation, the piston 22 only causes movement of the valves 12 and 23 through the action of the over-center linkage 33 and 38. If the joining O-rings 36 break, the diaphragm piston 22 and the piston rod 32 secured thereto will move to its extreme downward, see FIGS. 5 and 6, or extreme upward, see FIGS. 7 and 8, position, depending if the inlet water is forcing the piston 22 to its downstroke or upstroke position, respectively. Absent some other factor the direction of the water flow cannot change from one side of the piston 22 to the other side, so the piston stops its upward and downward movement and water flow from the inlet line 20 to the outlet line 27 stops, since the water coming into either the upper 31, or lower 21 chamber is trapped and cannot flow through. This stopping of water can result in serious problems such as the shut off of drinking water to livestock.

Means have been provided to prevent this shut off of water flow when the unit has stopped operation due to a failure. More particularly, a fail safe valve activating member A has been provided. Member A has an upper actuating bar B connected by a vertical bar D to a lower actuating bar C, with the vertical bar D being pivotally connected to the housing 11 by a pivot pin 35 passing laterally through the vertical bar D and the pin being secured in a boss 11A of the housing 11.

As seen in FIGS. 5 and 6 when the piston 22 and piston road 32 travel downwardly beyond the position shown in FIGS. 1 and 2, the pivot pin 37 on the right end of rods 33 engages the bottom of upper bar B at a location intermediate its ends and moves the member A counter clockwise. The right end of bar C passes under the valve bridge 41 and this counter clockwise movement of member A results in bar C lifting the bridge 41 so that the inlet valve 12 and outlet valve 23 are centralized and, as seen in FIG. 6 the O-rings 14 and 18, 25 and 29 are spaced from their valve seats 15, 19, 26 and 30, respectively. With this condition of the valves 12 and 23, water can freely flow through the body 11 from the line 20 to the line 27.

Contrarily, if the piston 22 and piston rod 32 move further up from their position as seen in FIGS. 3 and 4 to the position shown in FIGS. 7 and 8 the top of the piston rod 32 will engage the bottom of the left end of bar B and move the member A clockwise. The right end of the bar B passes over the boss 41A on the top of the valve bridge 41 and this clockwise movement of member A results in bar B depressing the bridge 41 so that the inlet valve 12 and outlet valve 23 are centralized and, as seen in FIG. 8 the O-rings 14, 18, 25 and 29 are spaced from their valve seats 15, 19, 26 and 30 respectively. With this condition of the valves 12 and 23, water can freely flow through the body 11 from the line 20 to the line 27.

An additive pump 44 is disposed in an extension 45 of the body 11. The extension has an upper bore 46 which is coaxial with and one-half the cross sectional area of a lower bore 47. A piston 48 connects to the lower end of the piston rod 32 and extends in a sliding and sealing relationship with the body 11 through the lower end of chamber 21. The piston rod 48 has an upper piston 49 carrying a peripheral O-ring 49A slidingly received in the bore 46 and a lower piston 50 carrying a peripheral O-ring 53 slidingly received in the lower bore 47 with the piston 49 and O-ring 49A having one-half the face area of the piston 50 and O-ring 53. A supply line 51 for additive fluid 51A connects to the bottom of extension 45 and a check valve 52 is located at the junction of the line 51 and extension 45. When piston 50 moves up check valve 52 is open and when piston 50 moves down, check valve 52 closes.

The piston 50 and the O-ring 53 cooperate to also provide a check valve. More particularly, and with reference to FIGS. 1-4 and FIGS. 9 and 10, the O-ring 53 is carried in an annular groove 53C formed in piston 50 having a lower flat shoulder 53B joined by an inwardly sloping groove, See FIG. 9, to an upper flat shoulder 53A. When the piston 50 moves upwardly, the piston ring 53 sealingly seats on the shoulder 53B thereby closing the check valve formed between the piston 50 and O-ring 53 allowing the piston and O-ring to form a vacuum thereunder to draw additive fluid 51A upwardly. The piston 50 has a pair of diametrically opposed slots 50A formed therein with the top of the slots extending above the upper wall 53A of the annular groove 53C in piston 50 while the upper end of the slots 50A terminate just above the lower wall 53B of the annular groove 53C. The lower portion of each slot 50A commencing at the upper wall 53A is angled outwardly in a truncated triangular shape, as seen in FIGS. 1-8. As seen in FIG. 10, the bottom of each slot 50A is deeper than the bottom of the annular groove 53C. When the piston 50 moves downwardly, as seen in FIGS. 3, 4, 5, 6 and 10, the O-ring 53 moves up to the shoulder 53A and the portion of the O-ring 53 adjacent the slot 50A moves into the triangular portion of the slot thereby providing a path through the slot under the O-ring 53 for additive fluid in the lower bore 47, above the closed check valve 52, to move past the valve formed by the piston 50 and O-ring 53.

As the pump piston rods are moved up, a quantity of additive fluid is drawn through check valve 52 and into the bore 47 below the piston 50 as shown in FIGS. 1 and 2. The quantity of fluid is equal to twice the amount of fluid which is desired to be injected into the quantity of water moving through the chambers 21 and 31 and out through line 27. An additive line 54 joins the bore 46 and the bore 47 to the outlet line 27 and is connected to the extension 45 at the junction of the bores 46 and 47.

As the piston rods 32 and 48 are pushed down, check valve 52 closes and additive fluid is forced up through the check valve formed by piston 50 and O-ring 53 into the chamber between the pistons 49 and 50. Piston 49 is one-half the area of piston 50 so that the chamber between the pistons 49 and 50 will only contain one-half the volume of additive being forced into it from the chamber below piston 50. The other one-half of this volume is forced out through line 54 to the outlet line 27. When the pump piston rod 32 and 48 are pulled up again, the check valve between piston 50 and O-ring 53 closed, a quantity of additive fluid is drawn up into the bore 47 below the piston 50 and the remainder of the one-half volume between the pistons 49 and 50 is forced out through line 54. By matching the volume of water required to move the diaphragm piston 22 with the volume of the additive fluid 51A drawn up and inserted by the piston 49 and 50, a given ratio of additive to water will be maintained.

Although the above description relates to a presently preferred embodiment, numerous modifications can be made therein without departing from the spirit of the invention as defined in the following claims:

What is claimed is:

1. A proportioning pump for pumping a liquid additive into a primary driving liquid comprising, (a) a housing, (b) a main driving piston sealingly mounted in said housing for reciprocal movement in response to flow of said primary liquid (c) an inlet line for passing said primary liquid into said housing and an outlet line for passing said primary liquid out of said housing; (d) a pair of valves in said housing with one being an inlet valve and the other being an outlet valve for passing said primary liquid through said housing around said piston from said inlet line to said outlet line; (e) a first piston rod carried by said piston; (f) an overcenter linkage, including a spring, with said linkage connecting said piston rod to said pair of valves, (g) a fail safe inlet and outlet valve operating means for opening both said inlet and outlet valves in the event of failure of said spring and allowing said primary liquid to flow from said inlet line to said outlet line; (h) a piston rod extension connected to said piston, (i) an additive chamber in said housing receiving said rod extension, (j) a pair of additive pistons slidingly and sealingly received in said chamber and on said rod extension with one being an upper piston and the other being a lower piston and with the upper piston having one-half the area of the lower of said pistons, (k) an additive fluid inlet line and an additive fluid therein, (l) said additive pistons moving in unison with said main piston for pumping said additive fluid from said additive inlet line to said outlet line from said housing.

2. A pump according to claim 1 wherein said fail safe inlet and outlet valve operating means includes said first piston rod and a portion of said linkage.

3. A pump according to claim 2 wherein said fail safe operating means is engaged by said first piston rod upon movement of said main piston above its normal operating condition and is engaged by a portion of said overcenter linkage upon movement of said main piston below its normal operating condition.

4. A pump according to claim 1 wherein said lower piston has a peripheral groove therein and has a piston O-ring in said peripheral groove with the periphery of said piston O-ring slidingly and sealingly engaging said chamber, said peripheral groove has an upper, lower and inner groove wall, said inner groove wall slopes inwardly and upwardly from said lower wall to said upper wall, a slot is formed in the piston and extends from above said lower groove wall to above said upper groove wall and with the portion of said slot in the piston at the location of said upper groove wall being wider than the remainder of said slot, whereby upon upper movement of said piston, said piston O-ring seat and seals against said lower groove wall, while upon downward movement of said lower piston the portion of said piston O-ring adjacent to the wider portion of said slot moving into said wider portion to allow passage of additive fluid thereunder whereby said piston O-ring acts as a seal and a check valve.

5. A pump according to claim 2 wherein said lower piston has a check valve means therein which means includes a peripheral O-ring received in an O-ring groove in said lower piston.

6. A pump according to claim 5 wherein said piston has a slot therein extending from said O-ring groove therein.

7. A pump according to claim 6 wherein said O-ring groove has upper, lower and inner groove walls and said slot means extends from above the lower groove wall to a location upwardly of the upper groove wall.

* * * * *